L. N. CATES.
TOOTH BRUSH.
APPLICATION FILED DEC. 18, 1916. RENEWED APR. 12, 1918.
1,268,544.
Patented June 4, 1918.
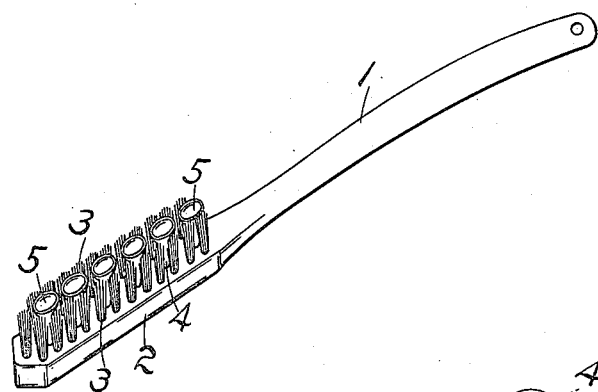
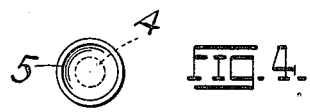
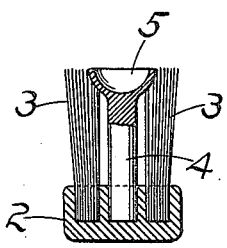
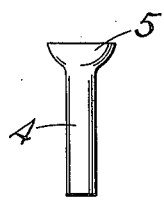
WITNESSES:
Harry A. Beines
Else M. Siegel
INVENTOR.
Lorwin N. Cates.
BY
ATTORNEY.

UNITED STATES PATENT OFFICE.

LORWIN N. CATES, OF ST. LOUIS, MISSOURI.

TOOTH-BRUSH.

1,268,544.     Specification of Letters Patent.     Patented June 4, 1918.

Application filed December 18, 1916, Serial No. 137,653. Renewed April 12, 1918. Serial No. 228,263.

*To all whom it may concern:*

Be it known that I, LORWIN N. CATES, a citizen of the United States, residing at St. Louis, State of Missouri, have invented certain new and useful Improvements in Tooth-Brushes, of which the following is a full, clear, and exact description, reference being had to the accompanying drawings, forming a part hereof.

My invention has relation to improvements in tooth brushes; and it consists in the novel features of construction more fully set forth in the specification and pointed out in the claims.

The object of the present invention is to provide a brush which, while subserving the purpose of a tooth cleanser, will at the same time serve as a vibrator for the gums, the vibrator element being in the form of an elastic pneumatic cup or sucker which, by seizing the surface of the gum and drawing it toward the enameled portion of the teeth, induces in the gum a healthy and rapid circulation, such as usually results from the application of vibrators and similar devices employed for massaging the skin, face and scalp. In the present embodiment of my invention the cup draws the gum tissue over the root of the tooth thereby preventing its exposure and keeping the same protected against germs and foreign matter from which the root should be permanently shielded. A further object is to so dispose the cups that they may be protected by the bristles by which the teeth are cleansed. The advantages of the invention will be fully apparent from the following detailed description thereof in connection with the accompanying drawings in which—

Figure 1 represents a perspective of a tooth brush having my invention applied thereto; Fig. 2 is an enlarged cross-section through the bristle-supporting terminal of the brush handle; Fig. 3 is an enlarged elevational view of one of the gum-massaging elements; and Fig. 4 is a top plan of Fig. 3.

Referring to the drawings, 1, represents the usual brush handle, and 2 the head to which the bristles 3 are usually secured. In the present embodiment of my invention there is disposed medially on the head 2 a row of rubber stems 4 whose outer ends terminate in sucker cups 5, the edges of the cups being substantially flush with the free ends of the bristles, the cups with their supporting stems being surrounded and protected on two sides and one end (the outer end) by the bristles. I may of course dispose the cups so as to be entirely surrounded by the bristles, but that would necessarily reduce the number of cups for a given size brush to make room for the bristles. I may too merely protect the cups on the sides by the bristles leaving the terminal cups unprotected without a departure from the principle of the invention. The preferred disposition however is that as shown in the drawings. Preferably the cups 5 and their supporting stems are made of rubber, though I desire to be understood as not limiting myself to this material since any available substitute is contemplated by my invention. Again, while I have here shown the cups formed integrally with their supporting stems, they need not be integral therewith, but may be secured thereto by cementing or any other means known to the art. Neither do I wish to be restricted to any particular method of securing the stems and cups to the handle of the brush, nor to the size of stem and cup, or to the number of stems and cups.

In cleaning the teeth, a brush should always be passed up and down across the gums and teeth while the brush is being passed horizontally along the teeth. This imparts to the brush a resultant spiral movement, and since in the vertical down strokes (for example in cleaning the upper teeth) more pressure is or should be applied to the gums and teeth than on the upstrokes, the gums are subjected to a sort of kneading action. Of course, a brush should always be applied wet, and being wet, the cups in my improved brush readily adhere to the gums operating as they do as the suckers from which the atmospheric air is expelled by the application of pressure. With the cups or suckers firmly adhering to the gums the latter can be readily pulled or drawn over the roots of the teeth with the downstrokes of the brush in cleaning the upper teeth and with the upstrokes in cleaning the lower teeth, as previously described, this pulling and kneading action resulting in increased blood circulation, and in a thorough massaging of the gums. To secure the necessary expulsion of air from the cups the cup-supporting stems should not undergo an undue deflection or bending as that would interfere with the proper and continuous contact of the edges of the cups with the gums. Such undue deflection is prevented by the protecting rows of bristles which may wholly or partly encircle the stems and cups. The cups may be considered as the gum-massaging section or portion of the brush, and the bristles as the tooth-cleansing portion or section. The two necessarily co-operate to massage or treat the gums and to clean the teeth. Many changes may obviously be resorted to without in any wise affecting the nature or spirit of the invention. By "cup" is meant any element having the quality or function of adhering to the gums in the operation of the cleaning of the teeth, irrespective of the physical form or shape of such element. I do not wish to be restricted to a dished or "cup" form of cup; and where the term "cup" is used in the claims it is to be understood in its broadest sense and without restriction as to form. Neither do I wish to be restricted to the use of "bristles" for cleaning the teeth.

Having described my invention what I claim is:

1. A brush of the character described comprising a handle, said handle having a terminal provided with a medially disposed row of sucker cups, and side rows of bristles bounding the cups.

2. A tooth-brush comprising a handle terminating in a suitable brush-support, a series of flexible stems disposed medially of said support, sucker cups terminating the free ends of the stems, bristles disposed on the sides and outer end of the series of stems and cups, the parts operating substantially as set forth.

3. In a brush of the character described, a handle, a row of flexible stems carried thereby, a sucker terminating each stem, and teeth cleansing bristles protecting said stems.

In testimony whereof I affix my signature in presence of two witnesses.

LORWIN N. CATES.

Witnesses:
 EMIL STAREK,
 ELSE M. SIEGEL.